United States Patent [19]

Hall

[11] Patent Number: 5,299,228

[45] Date of Patent: Mar. 29, 1994

[54] METHOD AND APPARATUS OF REDUCING POWER CONSUMPTION IN A CDMA COMMUNICATION UNIT

[75] Inventor: Scott M. Hall, Fort Worth, Tex.

[73] Assignee: Motorola, Inc., Schaumburg, Ill.

[21] Appl. No.: 997,057

[22] Filed: Dec. 28, 1992

[51] Int. Cl.⁵ .................. H04B 15/00; H04K 1/00; H04L 27/30
[52] U.S. Cl. .......................... 375/1; 370/50; 370/110.1; 370/111; 370/118
[58] Field of Search .............. 375/1; 370/50, 110.1, 370/111, 118

[56] References Cited

U.S. PATENT DOCUMENTS

| | | | |
|---|---|---|---|
| 4,227,054 | 10/1980 | Gilmer | 328/164 |
| 5,136,612 | 8/1992 | Bi | 375/1 |
| 5,150,377 | 9/1992 | Vannucci | 375/1 |

Primary Examiner—David C. Cain
Attorney, Agent, or Firm—Jon P. Christensen

[57] ABSTRACT

A method of, and means for, exchanging a communicated signal with a base site (10) by a communication unit (20) within a cellular system is provided. The method includes the steps of, and means for, transceiving the communicated signal under a broadband format while active and receiving the communicated signal under a narrowband format while idle.

20 Claims, 2 Drawing Sheets

METHOD AND APPARATUS OF REDUCING POWER CONSUMPTION IN A CDMA COMMUNICATION UNIT

FIELD OF THE INVENTION

The invention relates to communication systems and, in particular, to cellular communication systems using CDMA.

BACKGROUND OF THE INVENTION

In a broadband cellular communication system using spread-spectrum technology, such as code division multiple access (CDMA), the radio spectrum is divided into 40 frequency bands. The 40 bands are divided between a first and a second operator, generally assigning 20 bands to each. The 20 bands are equally divided with 10 bands used for forward communication, with the base station as the transmitter, and 10 bands used for reverse communication, with the mobile radio as the transmitter. Each band is typically 1.288 MHz wide and will handle numerous simultaneous users.

To make and receive calls within such a system, a mobile radio must monitor nearby base sites for paging information and for system information necessary for transmitting access requests on a communication channel referred to as a control channel. The mobile periodically scans for and measures signals of nearby base sites and selects the strongest site (presumably) nearest the mobile. Upon determination of a need to exchange a signal with another mobile radio (or PSTN subscriber) the mobile radio must transmit an access request and receive a channel allocation from the nearby base site (see chpts 1 and 2, *Spread Spectrum Systems* by Robert C. Dixon, John Wiley & Sons, Inc. 1984).

While CDMA systems provide a substantial measure of noise immunity over conventional narrowband systems, CDMA hand-portable radios typically require a larger, and heavier, power supply than narrowband communication units. The larger battery is necessitated by increased signal processing requirements of CDMA and the digital signal processors (DSPs) and microprocessor units (MPUs) required to process such signals.

The increased power consumption of CDMA signal processing results in limited battery life for CDMA portables. Efforts to increase battery life have included time cycling. For instance, a portable may be activated for monitoring/reception during a first frame followed by sleep cycles for the following nine frames. The process may then be repeated.

Time slotting has been only partially successful because of the time delays required for a CDMA receiver to "acquire" the CDMA signal. A CDMA receiver must remain active for at least two slots (one to acquire the signal and one to decode a communicated signal). Because of the immunity to noise offered by broadband communication systems, a need exists for a more power efficient method of monitoring for paging messages by portable CDMA communication units.

SUMMARY OF THE INVENTION

A method of, and means for, exchanging a communicated signal with a base site by a communication unit within a cellular system is provided. The method includes the steps of, and means for, transceiving the communicated signal under a broadband format while active and receiving the communicated signal under a narrowband format while idle.

DETAILED DESCRIPTION OF THE PREFERRED EMBODIMENT

Figure 1:
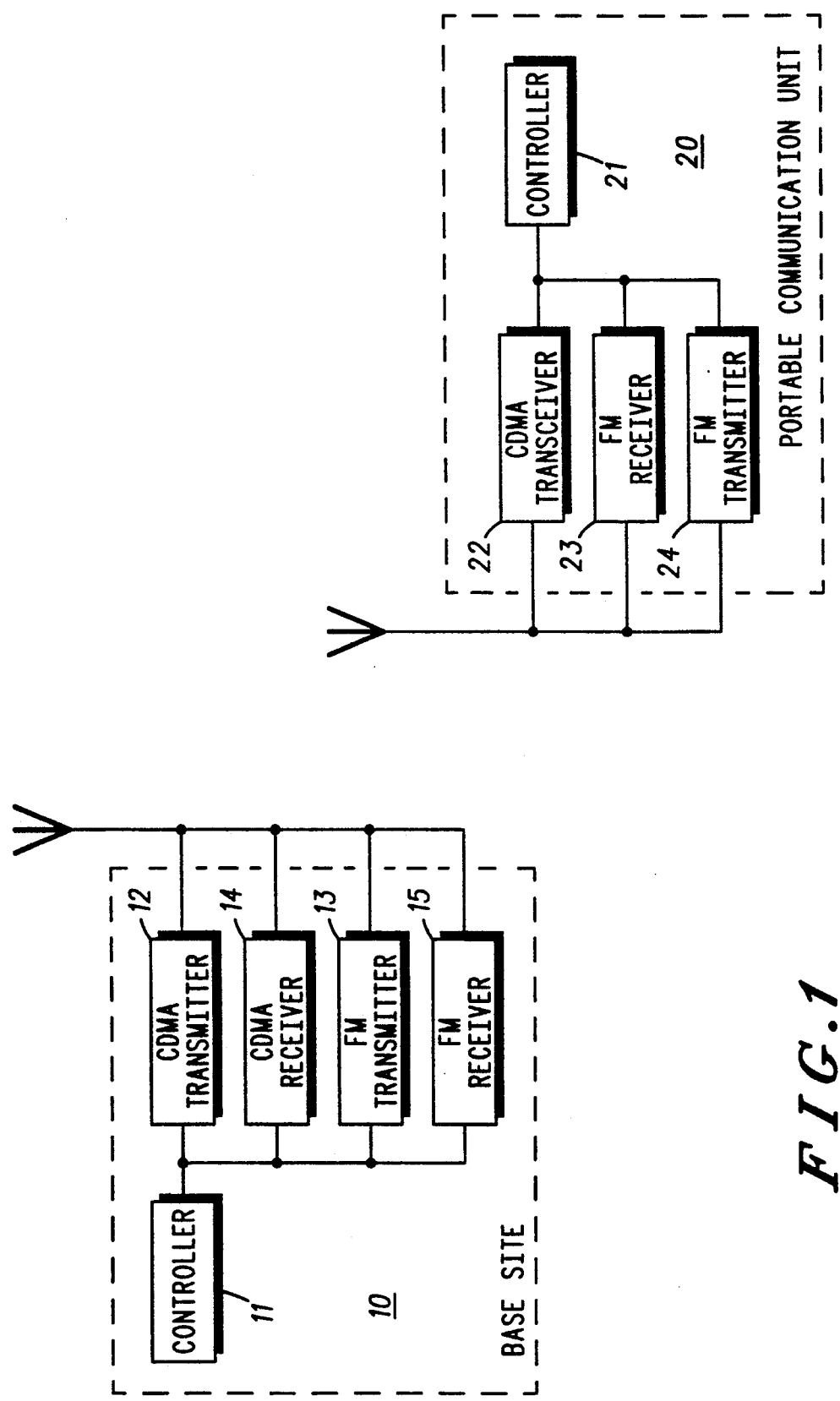
FIG. 1 is a block diagram of a CDMA cellular communication system using FM paging in accordance with one embodiment of the invention.

The solution to the problem of limited battery life in a broadband portable lies, conceptually, in substantially deactivating the broadband transceiver during idle monitoring periods (no calls in progress) and receiving paging information under a narrowband format. Portables within such a system, while constructed to operate predominantly under a broadband format (e.g., CDMA), are also equipped with a separate narrowband receiver (e.g., amplitude modulated (AM), frequency modulated (FM), quadrature phase shift keyed (QPSK), quadrature amplitude modulated (QAM), etc.) for receiving paging messages during idle periods. During inactive periods the portable substantially shuts down except for the FM receiver.

Inclusion and use of an FM paging receiver within a CDMA portable offers the advantages of substantially increased spectral efficiency offered by broadband transceivers and minimal power consumption, during idle periods, through use of narrowband receivers. The narrowband receivers, within the broadband portable, offer the benefit of minimal power consumption through the structural simplicity and minimal signal processing requirements of such receivers.

During active periods (call in progress), a controller (21) within a portable communication unit (20) (acting as a means for activating/deactivating the CDMA transceiver and FM receiver) maintains the CDMA transceiver (22) in an activated state transceiving a CDMA signal. During such active periods the FM receiver (23) is deactivated by the controller (21).

During inactive periods the CDMA transceiver (22) is deactivated by the controller (21) and the FM receiver (23) is activated. Following activation, paging information is transmitted from an FM transmitter (13) at a base site (10) to the communication unit (20) as suggested in the prior art (e.g., advanced mobile phone service (AMPS), or narrowband advanced mobile phone service (NAMPS)).

Upon receipt and decoding of a page directed to the communication unit (20), the controller (21) activates the CDMA transceiver (22) for transmission of an acknowledgment. Subsequent to activation of the CDMA transceiver (22) the call proceeds as suggested by the prior art.

Figure 2:
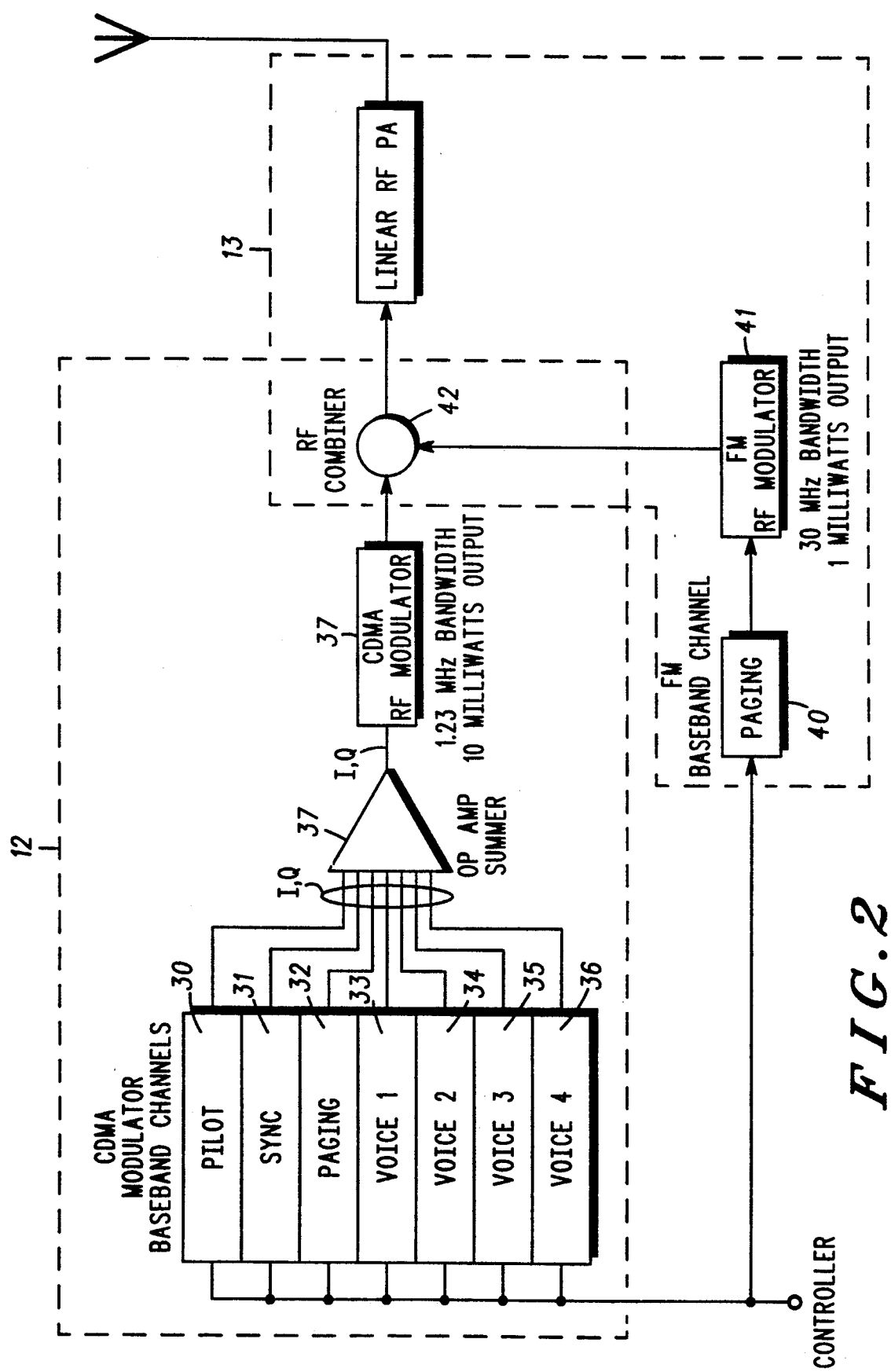
FIG. 2 is a block diagram of a CDMA transmitter and an FM transmitter of a base site in accordance with one embodiment of the invention.

FIG. 2 is a block diagram of a CDMA transmitter (12) and FDMA transmitter (13) of the base site (10) in accordance with one embodiment of the invention. Included within both the CDMA transmitter (12) and FDMA transmitter (13) is a combiner (42) and linear RF power amplifier (PA) (38) used by both the CDMA transmitter (12) and FDMA transmitter (13). The CDMA signals and FDMA signals are combined within the combiner (42) before amplification within the linear RF PA (38) and transmission to communication units (20).

Within the FM transmitter (13) a paging message is converted into an appropriate format within a paging modulator (40). Conversion may include parallel to serial conversion, convolutional coding, and insertion of framing bits. Following signal conversion within signal converter (40) the signal is modulated into an FM signal within a FM RF modulator (41). Following conversion to FM the signal is combined with a CDMA signal and transmitted for the benefit of communication units (16-18).

Within the CDMA transmitter (12) a more complicated process occurs. Within the CDMA modulator (for baseband channels (30-36), a input data signal may be convolutionally encoded, framed within a block interleaver, undergo frequency spreading under a specific user code, and a Walsh code before quadrature spreading and baseband filtering. The output signals of the CDMA modulator (for baseband channels (30-36)) are summed within the op amp summer (37) before undergoing a final spreading within a CDMA RF modulator (39).

Within the CDMA receiver (14) a reversal of the CDMA encoding process occurs. Following demodulation to baseband channels, acquisition of the CDMA signal occurs through synchronization acquisition and through cross-correlation of known pilots.

FM information signals transmitted by base stations are transmitted within the CDMA bandwidth, on a guard band of the CDMA bandwidth, or outside the CDMA bandwidth. Where the FM signal is transmitted within the CDMA bandwidth, or guardband, the FM signal is power controlled. Power control in such a case is set to a magnitude substantially equal to the power of other CDMA channels serviced through the same base site (10). Limitation of the power of a 30 kHz wide FM channel to a magnitude equal to other CDMA channels has been determined to place the FM signal at least 6 dB above a noise level represented by competing CDMA channels.

Reuse of frequencies of FM signaling channels among base sites (10) is, as provided, under an appropriate reuse algorithm (e.g., Graziano, U.S. Pat. No. 4,128,740). Reuse of FM frequencies (under a frequency division multiple access (FDMA) format) among the base sites under such an algorithm may result in reuse factors of six or less. Use of a reuse factor of six or less results in a small number of FDMA channels in which a FM signal may reside and a reduction in scan time necessary for a mobile to located an FDMA signaling channel of an adjacent base site.

By way of example; a communication unit (20) upon activation (and in the absence of a call) immediately reverts to a quiescent state. In such a state the controller (21) maintains the FDMA receiver (23) in an activated state and the CDMA transceiver (22) in a deactivated state. In the quiescent state the controller causes the FDMA receiver to scan for an FDMA signaling channel of an adjacent base site (10). Upon locating and selecting an appropriate FDMA signaling channel, the controller (21) receives and decodes control information from the base site (10). Included within the control information from the base site (10) are parameters and channel access information (e.g., CDMA center frequency, CDMA bandwidth, and CDMA spreading codes) that are stored by the controller (21) for later use in system access.

If the operator of the communication unit (20) should choose to make a call, then the controller (21) would reconfigure the communication unit (20) for the call. In preparation for the call, the controller would activate the CDMA transceiver (22) and deactivate the FDMA receiver (23). The controller (21) would also retrieve the stored CDMA parameters stored for CDMA access.

Following retrieval and entry of the stored CDMA access codes into the CDMA transceiver, the communication unit (20) transmits an access request to the base site (10). Upon receipt of the access request the base site (10) may assign a set-up channel and proceed through call processing as suggested by the prior art.

If, during the quiescent state, a call were placed to the communication unit (20), then the call is detected by a page received by the FDMA receiver (23) and decoded by the controller (21). Upon decoding the page and matching a page identifier against an identifier of the communication unit (20), the controller (21) reconfigures the communication unit (20) for receipt of the call. As above, the controller (21) deactivates the FDMA receiver (23) and activates the CDMA transceiver (22). The controller (21), in turn, transmits a paging response through the CDMA transceiver (22). Although it may take a brief interval for the unit (16) to acquire the CDMA signal, the call then proceeds as suggested by the prior art.

In another embodiment of the invention the communication unit (20) further includes a FDMA transmitter (24). Paging, page responses, and call set-up are accomplished under a FDMA format with a base site (10) also configured (through inclusion of an FM receiver (15)) to exchange control information under a FDMA format with the communication unit (20).

In another embodiment of the invention the base site (10) comprises a dual mode system capable of supporting communication transactions under either FDMA or CDMA formats. Under such a embodiment paging and page responses are exchanged under a FDMA format with the communication unit (20) designating a format within the page response.

In another embodiment of the invention the controller (21) periodically deactivates the FDMA receiver (24) of the communication units (20) during idle periods to further enhance power savings through use of a slotted monitoring process. Under such a process the communication unit (20) may remain activated for a first set of frames of a monitoring interval and then deactivate for remaining frames of the monitoring interval. Deactivation for a portion of the monitoring interval may be based upon an internal timer (not shown) within the controller (21) or under the control of the base site.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (e.g., use of AM, QPSK, or QAM for paging messages), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

I claim:

1. A method of exchanging a communicated signal with a base site by a communication unit within a cellular system comprising: transceiving the communication signal under a broadband format while the communication unit is active; and receiving the communicated signal by the communication unit under a narrowband format while the communication unit is idle.

2. The method as in claim 1 wherein the step of transceiving the communicated signal under a broadband format while active further includes the step of deactivating a narrowband receiver.

3. The method as in claim 1 wherein the step of receiving the communicated signal under a narrowband format while idle further includes the step of deactivating a broadband transceiver.

4. A communication unit comprising: means for transceiving a communicated signal under a broadband format while active; and means for receiving the communicated signal under a narrowband format while idle.

5. The communication unit as in claim 4 wherein the means for transceiving a communicated signal under a broadband format while active further comprises a code division multiple access transceiver.

6. The communication unit as in claim 4 wherein the means for receiving the communicated signal under a narrowband format while idle further comprises a frequency modulated receiver.

7. The communication unit as in claim 4 further comprising means for deactivating the means for transceiving a communicated signal under a broadband format while idle; and means for deactivating the means for receiving the communicated signal under a narrowband format while active.

8. In a cellular communication system a method of exchanging communication signals between base sites and communication units, such method comprising the steps of: transmitting paging information from a base site under a frequency division multiple access format; and transceiving other information under a code division multiple access format.

9. The method as in claim 8 wherein the step of transceiving other information under a code division multiple access format further comprising the step of tuning a code division multiple access transceiver to a code division multiple access channel.

10. The method as in claim 9 wherein the step of transmitting paging information from a base site under a frequency division multiple access format further comprising the step of tuning a frequency division multiple access transmitter at the base site to a frequency division multiple access channel within the code division multiple access channel.

11. The method as in claim 9 wherein the step of transmitting paging information under a frequency division multiple access format further comprising the step of tuning a frequency division multiple access transmitter at the base site to a frequency division multiple access channel within a guardband of the code division multiple access channel.

12. The method as in claim 9 wherein the step of transmitting paging information under a frequency division multiple access format further comprising the step of tuning a frequency division multiple access transmitter at the base site to a frequency division multiple access channel outside the code division multiple access channel.

13. In a cellular communication system a method of exchanging communication signals between base sites and communication units, such method comprising the steps of: transmitting paging information between base sites and communication units under a frequency division multiple access format; and transceiving information on traffic channels between base sites and communication units under a code division multiple access format.

14. The method as in claim 13 wherein the step of transceiving information on traffic channels between base sites and communication units under a code division multiple access format further comprising the step of tuning a code division multiple access transceiver to a code division multiple access channel.

15. The method as in claim 14 wherein the step of transmitting paging information between base sites and communication units under a frequency division multiple access format further comprising the step of tuning a frequency division multiple access transmitter at the base site to a frequency division multiple access channel within the code division multiple access channel.

16. The method as in claim 14 wherein the step of transmitting paging information between base sites and communication units under a frequency division multiple access format further comprising the step of tuning a frequency division multiple access transmitter at the base site to a frequency division multiple access channel within a guardband of the code division multiple access channel.

17. The method as in claim 14 wherein the step of transmitting paging information between base sites and communication units under a frequency division multiple access format further comprising the step of tuning a frequency division multiple access transmitter at the base site to a frequency division multiple access channel outside the code division multiple access channel.

18. The method as in claim 13 further including the step of transmitting paging responses between communication units and base sites under a frequency division multiple access format.

19. The method as in claim 13 further including the step of power controlling the transmitted paging information.

20. In a cellular communication system using a code division multiple access format and a frequency division multiple access format, a method of paging code division multiple access communication units and frequency division multiple access communication units, such method having the steps of: transmitting a frequency division multiple access paging signal to both code division multiple access communication units and frequency division multiple access communication units; and receiving and decoding the page by both the code division multiple access communication units and frequency division multiple access communication units.

* * * * *